US009420090B2

(12) United States Patent
Mohseni et al.

(10) Patent No.: US 9,420,090 B2
(45) Date of Patent: Aug. 16, 2016

(54) DIAGNOSTIC METHODS FOR TWISTED PAIR TELEPHONE LINES BASED ON LINE DATA DISTRIBUTION ANALYSIS

(75) Inventors: Mehdi Mohseni, Menlo Park, CA (US); Mohamad Charafeddine, Stanford, CA (US); Chan-Soo Hwang, Sunnyvale, CA (US); Ardavan Maleki Tehrani, Menlo Park, CA (US)

(73) Assignee: Adaptive Spectrum and Signal Alignment, Inc., Redwood City, CA (US)

(*) Notice: Subject to any disclaimer, the term of this patent is extended or adjusted under 35 U.S.C. 154(b) by 0 days.

(21) Appl. No.: 14/394,074

(22) PCT Filed: Apr. 13, 2012

(86) PCT No.: PCT/US2012/033545
§ 371 (c)(1),
(2), (4) Date: Oct. 10, 2014

(87) PCT Pub. No.: WO2013/154579
PCT Pub. Date: Oct. 17, 2013

(65) Prior Publication Data
US 2015/0085996 A1 Mar. 26, 2015

(51) Int. Cl.
*H04M 1/24* (2006.01)
*H04M 3/08* (2006.01)
(Continued)

(52) U.S. Cl.
CPC ............ *H04M 3/2209* (2013.01); *H04M 3/085* (2013.01); *H04M 3/306* (2013.01); *H04M 2201/18* (2013.01)

(58) Field of Classification Search
CPC . H04M 3/306; H04M 11/062; H04M 3/2209; H04M 1/24; H04M 3/304; H04M 3/22

USPC .............. 379/1.01, 1.03, 1.04, 22.03, 27.08, 379/29.09
See application file for complete search history.

(56) References Cited

U.S. PATENT DOCUMENTS

| 7,809,116 B2* | 10/2010 | Rhee ....................... H04B 3/48 379/1.03 |
| 2005/0141673 A1* | 6/2005 | Lunt ...................... H04M 3/30 379/22 |
| 2007/0263775 A1* | 11/2007 | Clark .................... H04L 43/022 379/1.01 |

FOREIGN PATENT DOCUMENTS

| CN | 1643885 | 7/2005 |
| EP | 1349355 | 10/2003 |

(Continued)

OTHER PUBLICATIONS

International Search Report and Written Opinion for International Patent Application No. PCT/US2012/033545, mailed Dec. 7, 2012.
(Continued)

*Primary Examiner* — Quoc D Tran
(74) *Attorney, Agent, or Firm* — Green, Howard & Mughal LLP

(57) ABSTRACT

Methods and systems for twisted pair telephone line diagnostics based on patterns of line data occurring over time. An observed data distribution is classified as periodic or based on modeled distributions previously determined to correspond to a known line activity, fault type, or fault location. A disruption or parameter value pattern is classified through statistical inference of operational and performance data collected from the line. Where the disruption and/or parameter value(s) correlate with a time the customer is at the customer premises, an inference is made that the line fault causing the disruption is more likely at the CPE than at the Central Office. Where the disruption distribution is classified as being a result of human activities initiated on the line, a fault condition associated with the activity is inferred. Where a disruption pattern is correlated with human initiated plain old telephone service (POTS), a micro-filter problem is inferred for the line.

21 Claims, 8 Drawing Sheets

(51) Int. Cl.
*H04M 3/22* (2006.01)
*H04M 3/30* (2006.01)

(56) References Cited

FOREIGN PATENT DOCUMENTS

| | | |
|---|---|---|
| EP | 1843564 | 10/2007 |
| JP | 2005522105 | 7/2005 |
| JP | 2005236863 | 9/2005 |
| JP | 2006340050 | 12/2006 |
| JP | 2010531553 | 9/2010 |

OTHER PUBLICATIONS

International Preliminary Report on Patentability for International Patent Application No. PCT/US2012/033545, mailed Oct. 23, 2014.
First Office Action for Chinese Patent Application No. 201280073314.3 mailed May 4, 2016, 8 pages [No Translation Available].
Notice of Reasons for Rejection for Japanese Patent Application No. 2015-505695 mailed Mar. 29, 2016, 3 pages [No Translation Available].

* cited by examiner

DIAGNOSTIC METHODS FOR TWISTED PAIR TELEPHONE LINES BASED ON LINE DATA DISTRIBUTION ANALYSIS

CROSS-REFERENCE TO RELATED APPLICATIONS

This application is the U.S. National Phase of International Application No. PCT/US2012/033545, filed Apr. 13, 2012, the disclosure of which is incorporated herein by reference in its entirety.

TECHNICAL FIELD

The subject matter described herein relates generally to the field of telecommunication, and more particularly to systems and methods for automated diagnostics of twisted pair telephone lines in a digital subscriber line (DSL) network.

BACKGROUND

Digital subscriber line (DSL) technologies generally include digital subscriber line equipment and services using packet-based architectures, such as, for example, Asymmetric DSL (ADSL), High-speed DSL (HDSL), Symmetric DSL (SDSL), and/or Very high-speed/Very high-bit-rate DSL (VDSL). Such DSL technologies can provide extremely high bandwidth over a twisted pair line and offers great potential for bandwidth-intensive applications. DSL services in the 30 K-30 MHz band are however more dependent on line conditions (for example, the length, quality and environment of the line) than is Plain Old Telephone Service (POTS) operating in the <4K band.

While some lines (loops) are in good physical condition for implementing DSL (for example, having short to moderate lengths with operative micro-filters or splitters correctly installed and with no bridged taps and no bad splices), many lines are not as suitable. For example, micro-filters may be missing or inoperative. Even where a line is initially qualified at a given quality, issues may arise over time such that long-term line management is needed.

Assessment of a line's physical configuration is an important step in the implementation and management of any DSL network. Physical line diagnostics includes a detection and/or localization of conditions or faults on a line. Such physical line diagnostics are important because the bit-rate that can be achieved for a given communication technology (e.g., DSL) is often dependent on the physical configuration of the line.

In addition to a given line's physical configuration, impulse noise or other noise may also limit the performance of DSL systems dynamically. Such noise may originate from sources that may include other DSL systems, or other systems whose signals are coupled on the twisted pairs used by a DSL system. Noise may be particularly strong when twisted pairs are physically close, such as when they share a common binder. Knowledge of noise effects is very useful for DSL management operations, because it helps with identifying the cause of poor performance, and because it may become a basis for correcting the problem, for example with an appropriate filter.

Line diagnostics in the art generally rely on analysis of data parameters collected from a line to estimate a line configuration or detect the presence of a fault in the line, such as a missing micro-filter. Conventional analysis techniques that attempt to correlate a particular value of a parameter (e.g., transmit power), or a change in that value, to a particular fault are subject to misdetection resulting from either a first type of error where the line data analysis algorithm has a sensitivity to real features that is too low, or a second type of error where sensitivity to spurious features is too high.

Techniques improving detection capability and/or improving the accuracy of automated line diagnostics are therefore advantageous.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

Figure 1:
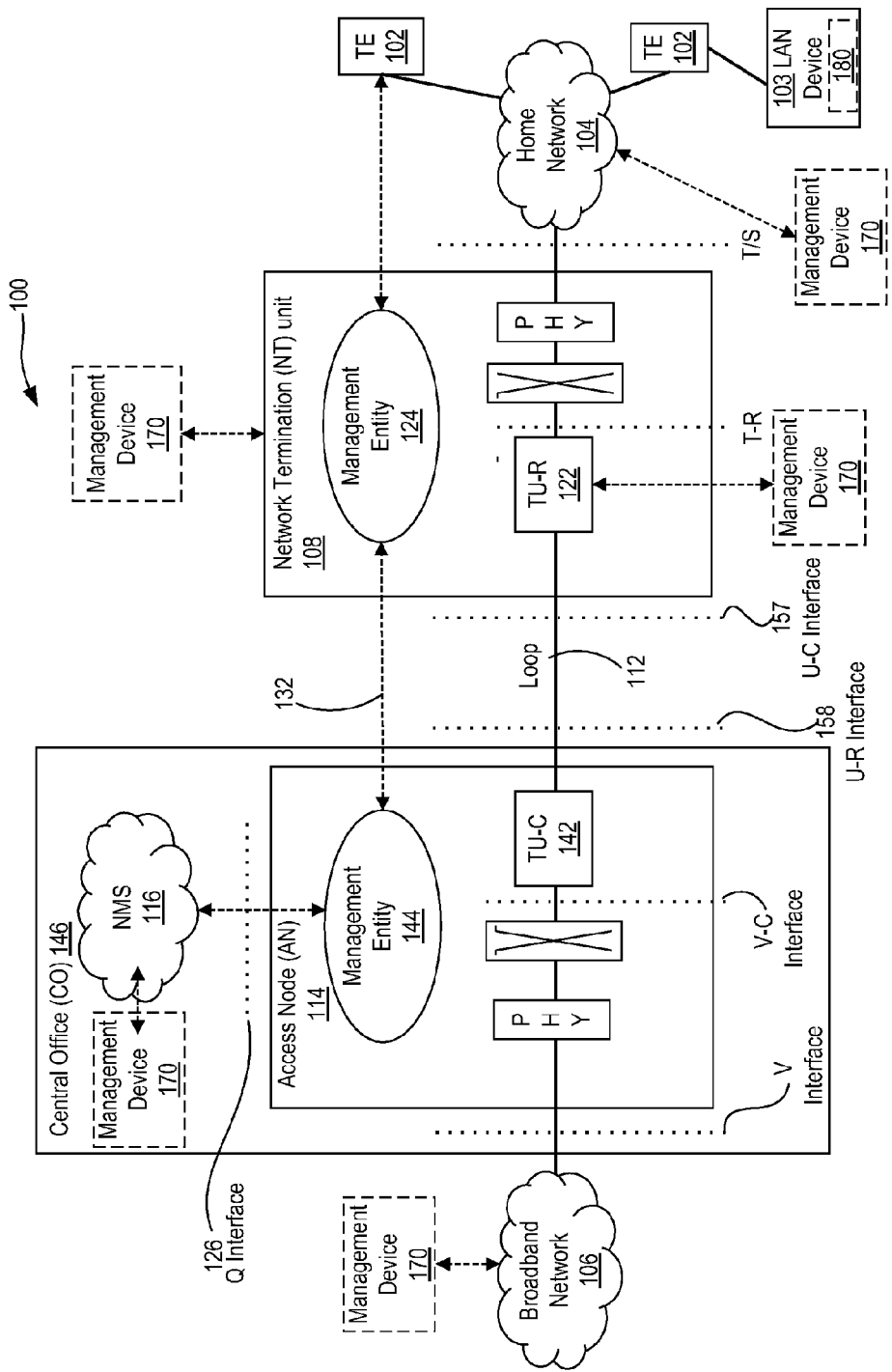
FIG. 1 illustrates an exemplary network architecture in which embodiments of the present invention may operate.

Described herein are methods and systems for twisted pair telephone line diagnostics based on patterns of line data occurring over time. For brevity, the exemplary embodiments are described in the context of a digital subscriber line (DSL) network. As used herein, "line diagnostics" refers to detection or determination of a physical line configuration parameter, such as, but not limited to, detection of a fault, such as a missing or inoperative micro-filter, and a localization of the fault, (e.g., at the customer premises equipment or "CPE" side) or a characterization of noise on a line. The diagnostic methods described herein may be readily applied by those of ordinary skill in the art toward diagnosis of any other physical line parameters which are known in the art to generate similar physical signatures on a line that would also be identifiable over time based on a pattern or distribution of a particular data parameter values, change in value, or function of the data, that is associated with a DSL link disruption.

Embodiments of the present invention associate particular parameter values, or a change in parameter values with an activity on the line or with a condition of the line based on an analysis of a distribution of the parameters characterizing the DSL communications on the line over a period of time. A DSL link between two DSL transceivers at opposite ends of a line can suffer disruptions due to copper or noise impairments. It is a challenge to identify/detect the fault and/or determine the fault location, for example whether the fault is within the customer premises, or not. The methods and systems described herein assign a line condition based on a sample population of events (e.g., disruptions) that occur on the line over a sampling time period. Similarly, it is a challenge to differentiate between effects of human line activity from impulse noise or other noise sources. The methods and system described herein infer a noise source based on a distribution of a population of events (e.g., disruptions) that occur on the line over a time period. The methods and system described herein account for an internal structure of the line data parameter values as a group which is not evident through analysis of individual samples, and as such, the methods and systems described herein are distinct from techniques which attempt to detect a line condition based on a single event (e.g., by detecting a single change in value of line data parameter).

In embodiments, an observed distribution is classified on the basis of modeled distributions previously determined to correspond to a known line activity or condition. Depending on the embodiment, a disruption or parameter value pattern is classified through statistical inference of operational and performance data collected from the line over time via either the Central Office (CO) side (e.g. from a DSL access multiplexer, or DSLAM), the customer premises (CP) side (e.g. from a CPE, DSL modem, gateway, or line enhancement device), or both. In embodiments, where the disruptions and/or parameter values correlate with a time the customer is present at the customer premises, an inference is made that the line fault condition causing the disruption is more likely at the CPE-side than at the Central Office (CO). In further embodiments, where the pattern of disruptions is classified as being on the CPE side and as being a result of human activities initiated on the line, a fault condition associated with the activity is inferred. In one exemplary embodiment, where a disruption pattern is correlated with human initiated plain old telephone service (POTS), a missing or inoperative micro-filter, is inferred for the line.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer or accessed through cloud storage. Such a computer program may be stored in a computer readable storage medium, such as, but not limited to, any type of disk including floppy disks, optical disks, flash, NAND, solid state drives (SSDs), CD-ROMs, magnetic-optical disks, read-only memories (ROMs), random access memories (RAMs), EPROMs, EEPROMs, magnetic or optical cards, or any similar type of non-transitory media suitable for storing electronic instructions on a time scale that is sufficient to be considered non-transitory by one of ordinary skill in the art. In one embodiment, a non-transitory computer readable storage medium having instructions stored thereon, causes one or more processors within a Diagnostics Device to perform the diagnostic methods and operations described herein. In another embodiment, the instructions to perform such methods and operations are stored upon a non-transitory computer readable medium for later execution.

FIG. 1 illustrates an exemplary network architecture 100 in which embodiments may operate in compliance with the G.997.1 standard (also known as G.ploam). Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+(G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding.

The G.997.1 standard specifies the physical layer management for ADSL transmission systems based on the clear, Embedded Operation Channel (EOC) defined in G.997.1 and use of indicator bits and EOC messages defined in G.992.x standards. Moreover, G.997.1 specifies network management elements content for configuration, fault and performance management. In performing the disclosed functions, systems may utilize a variety of operational data (which includes performance data) that is available at an Access Node (AN).

In FIG. 1, a user's terminal equipment 102 (e.g., a CPE device or a remote terminal device, network node, LAN device, etc.) is coupled to a home network 104, which in turn is coupled to a Network termination (NT) Unit 108. DSL Transceiver Units (TU) are further depicted (e.g., a device that provides modulation on a DSL loop or line). In one embodiment, NT unit 108 includes a TU-R (TU Remote), 122 (for example, a transceiver defined by one of the ADSL or VDSL standards) or any other suitable network termination modem, transceiver or other communication unit. NT unit 108 also includes a Management Entity (ME) 124. Management Entity 124 may be any suitable hardware device, such as a microprocessor, microcontroller, or circuit state machine in firmware or hardware, capable of performing as required by any applicable standards and/or other criteria. Management Entity 124 collects and stores, among other things, operational and performance data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements.

Each TU-R 122 in a system may be coupled with a TU-C (TU Central) in a Central Office (CO) or other central location. TU-C 142 is located at an Access Node (AN) 114 in Central Office 146. A Management Entity 144 likewise maintains an MIB of operational data pertaining to TU-C 142. The Access Node 114 may be coupled to a broadband network 106 or other network, as will be appreciated by those skilled in the art. TU-R 122 and TU-C 142 are coupled together by a line (loop) 112, which in the case of ADSL may be a twisted pair line, such as a telephone line, which may carry other communication services besides DSL based communications. Either Management Entity 124 or Management Entity 144 may implement and incorporate a diagnostic/management device 170, as described herein. The diagnostic/management device 170 may be operated by a service provider or may be operated by a third party, separate from the entity which provides DSL services to end-users. Thus, in accordance with one embodiment diagnostic/management device 170 is operated and managed by an entity which is separate and distinct from a telecommunications operator responsible for a plurality of digital communication lines. Management Entity 124 or Management Entity 144 may further store collected WAN information and collected LAN information within an associated MIB.

Several of the interfaces shown in FIG. 1 are used for determining and collecting performance and/or operational data from the line. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from TU-C 142, while far-end parameters from TU-R 122 may be derived by either of two interfaces over the UA interface. Indicator bits and EOC messages may be sent using embedded channel 132 and provided at the Physical Medium Dependent (PMD) layer, and may be used to generate the required TU-R 122 parameters in ME 144. Alternately, the Operation, Administration and Maintenance (OAM) channel and a suitable protocol may be used to retrieve the parameters from TU-R 122 when requested by Management Entity 144. Similarly, the far-end parameters from TU-C 142 may be derived by either of two interfaces over the U-interface. Indicator bits and EOC message provided at the PMD layer may be used to generate the required TU-C 142 parameters in Management Entity 124 of NT unit 108. Alternately, the OAM channel and a suitable protocol may be used to retrieve the parameters from TU-C 142 when requested by Management Entity 124.

At the U interface, there are two management interfaces, one at TU-C 142 (the U-C interface 157) and one at TU-R 122 (the U-R interface 158). Interface 157 provides TU-C near-end parameters for TU-R 122 to retrieve over the line 112. Similarly, U-R interface 158 provides TU-R near-end parameters for TU-C 142 to retrieve over the U interface/loop/line 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, TU-C and TU-R pairs may use it for transporting physical layer OAM messages. Thus, the TU transceivers 122 and 142 of such a system share various operational data maintained in their respective MIBs.

Generally, the diagnostic methods and systems described herein may be performed at any point(s) within the network architecture 100. As shown in FIG. 1, either or both ends of the line 112, may include line data collection means. For example, in one embodiment, a data collector for measuring a line data parameter at one of the two ends of the line 112 is disposed at the CO side (TU-C 142). In an alternate embodiment, a data collector for measuring a data parameter at one of the two ends of the line 112 is disposed at the CPE side (TU-R 122). A data collector for collecting a line transfer function measurement performed by transmission from an opposite end of the line 112 may similarly be disposed at either or both ends of the line 112. As further illustrated in FIG. 1, the data generated for the line 112 is relayed to the diagnostic/management device 170. The diagnostic/management device 170 then performs one or more of the methods described herein to analyze the data received for a given line 112 to arrive at detection or localization of one or more line faults.

Figure 2:
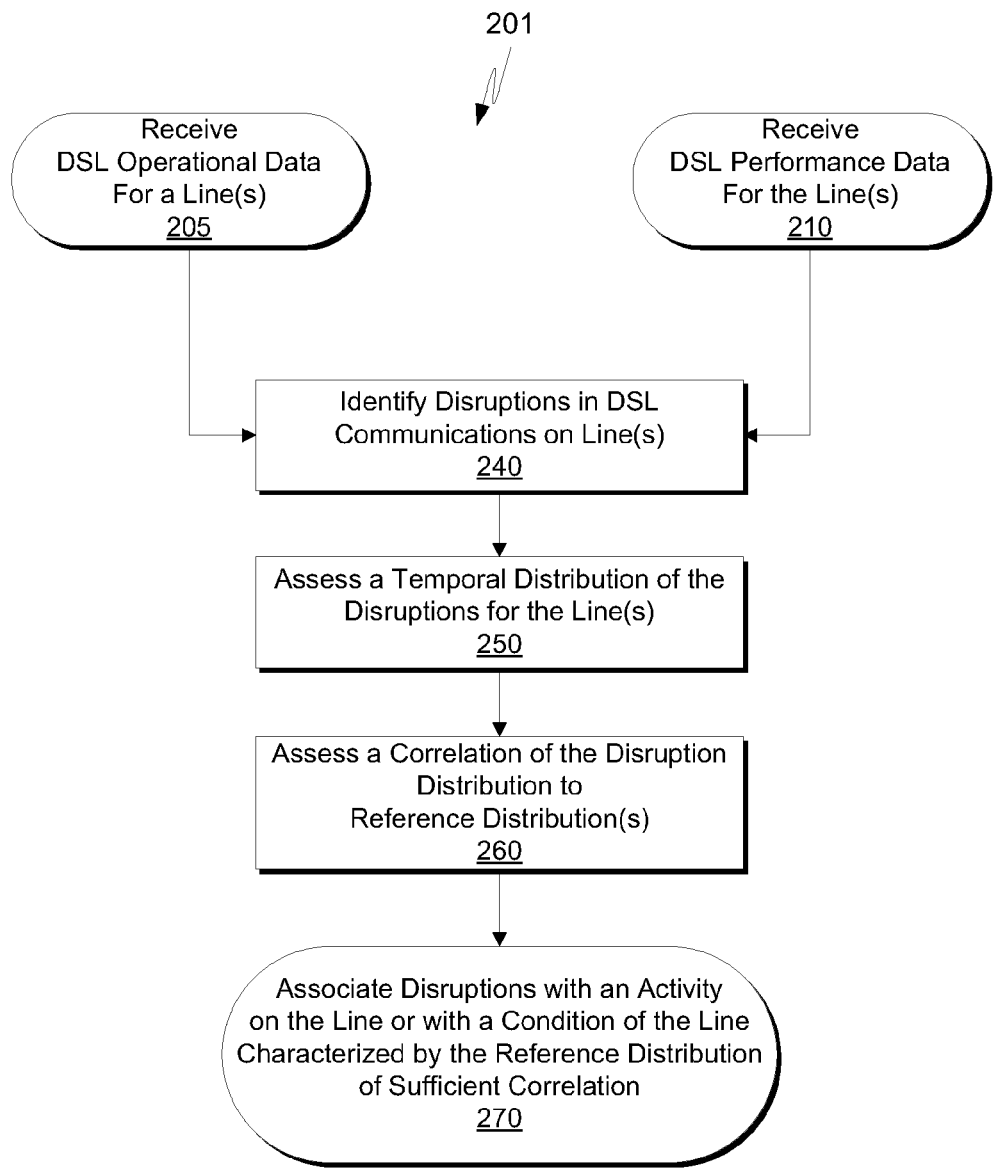
FIG. 2 is a flow diagram illustrating a line diagnostics method including a line data distribution analysis, in accordance with an embodiment of the present invention.

FIG. 2 is a flow diagram illustrating a line diagnostics method 201 including a line data distribution analysis, in accordance with an embodiment. Exemplary implementations of the method 201 are further illustrated in FIGS. 3A-3C. Beginning with FIG. 2, the method 201 begins with receiving DSL operational data at operation 205, or receiving DSL performance data at operation 210, or both, for one or more lines in a DSL system, such as illustrated in FIG. 1. Where data is received for more than one line, the method 201 may be performed iteratively with a given individual line analyzed in each iteration.

As employed herein, "DSL operational data" is data which is generated by a DSL device as DSL communications are conducted on the line and is typically made available externally to the DSL device via element management protocols such as the G.997.1 standard specification of the physical layer management for DSL transmission systems based on the clear embedded operation channel (EOC) defined in G.997.1 and G.99x standards. Notably, the DSL device reporting out operational data need not be a modem, but rather merely capable of collecting operational data from the line that is generated through operation of a Digital Subscriber Line (DSL) modem on a channel. Thus, while in certain embodiments, the DSL device reporting out the DSL operational data collected at operation 205 includes a modem, in other embodiments a separate device, such as a DSL signal booster that lacks a modem, collects the operational data generated as a result of training or show-time operation.

Examples of DSL operational data parameters that may be collected at operation 205 include sync rate, measures of bit rate (e.g., maximum attainable bit rate (MABR)), measures of noise, such as frequency-dependent measured quiet-line or active-line quiet line noise, measures of attenuation, such as channel average attenuation measurements (e.g. LATN, SATN), channel bit distributions, transmit power levels, measured noise margin, measured peak-to-average power ratio, measured channel logarithmic magnitude HLOG[n], mean square error per tone, MSE[n], signal-to-noise ratio per tone, SNR[n], carrier masks (e.g., CARMASK of G.997.1 or similar), and tone-spectral shaping parameters (PSDMASK), measured channel gain, measured channel phase, line and spectrum profile parameters, and actual INP (Impulse Noise Protection) and actual delay, and the operational xDSL system type. When applicable, the operational data covers data for both the upstream and downstream directions.

As employed herein, "DSL performance data" is distinguished from operational data in that performance data is counter data (i.e., counts of an event during a certain time period). Like the operational data received at operation 205, the performance data received at operation 210 is also generated by a DSL device as DSL communications are conducted on the line and is typically also made available externally to the DSL device via element management protocols. Furthermore, the DSL device reporting out performance data need not be a modem, but rather merely capable of collecting performance data from the line that is generated through operation of a Digital Subscriber Line (DSL) modem on a channel. Thus, while in certain embodiments, the DSL device reporting out the DSL performance data collected at operation 210 includes a modem, in other embodiments a separate device, such as a DSL signal booster that lacks a modem, collects the performance data generated as a result of training or show-time operation.

Examples of DSL performance data parameters that may be collected at operation 205 include, a count of retrains, reported error-correction-parity, the total number of bit-swaps occurring in a recent time interval, the distribution of Forward Error Correction (FEC) errors, Code Violation (CV) counts, Errored Seconds (ES) violations, Severe Errored Seconds (SES) over successive sub-intervals of a time interval, and a count of failed synchronization attempts. When applicable, the Performance data covers both the Near End and the Far End directions.

In embodiments, the operational data received at operation 205 and performance data received at operation 210 is historical data in the sense that the parameters of data have been collected over a period of time (i.e., a sampling period), at a known sampling rate, such that each parameter value received is associated with a reference time (i.e. a time series). This historical data may be received retroactively from a storage made available to the device performing the method 201. In the exemplary embodiment however, a DSL device capable of generating the operational data is polled for the desired data parameters to collect data for a specific sampling period. Such polling may be performed via the element management protocols described elsewhere herein for DSL devices. Depending on the implementation, the polling rate may be anywhere from once/day to once/minute. In response to each poll, a value of an operational data parameter is received and appended to a time series aggregated in a memory or storage device for subsequent analysis within method 201. Similarly, for performance data that is reported out periodically (e.g., without polling), typically with a time interval of 15 minutes between samples, each count value received is appended to a time series being accumulated in a memory or storage device in preparation for subsequent analysis within method 201.

At operation 240, the DSL data received for a line is analyzed to identify disruptions in the DSL communications on the line. As employed herein, a "disruption" on a DSL link is either an occurrence of a retrain, a parameter value that has exceeded or fallen below a threshold, or a significant and sudden change in line quality (in the form of an increase or decrease). Such a change in quality is identified by detecting a change in value of at least one operational data parameter or at least one performance data parameter. Exemplary algorithms for detecting a disruption on the line are further described elsewhere in the exemplary embodiments illustrated in FIGS. 3A-3C. In certain embodiments, the detection algorithm employed at operation 240 is to detect a change in quality that is unexpected for a line of a given quality. This detection of "unexpected disruptions" is useful in identifying events that are sudden in nature, such as, but not limited to, a missing micro-filter induced disruption, a human-initiated disruption, or a noise induced disruption. Thus, the disruption detection may be normalized in some manner to be more or less aggressive as a function of, or based on, line quality such that not all disruptions in a poor quality line are detected at operation 240. For instance, where disruptions are more probable, the qualification conditions for disruption detected at operation 240 are more stringent. Exemplary techniques for adjusting disruption detection algorithms based on a quality of the line are further described elsewhere in the context of FIG. 4.

Proceeding with the method 201, at operation 250 a distribution of the disruptions detected at operation 240 for a given line over a given sampling time period (i.e., a temporal disruption distribution) is generated. This distribution is then analyzed in an effort to classify the distribution based on one or more predetermined reference distributions. At operation 260, a correlation between the observed distribution for the line and the one or more reference distributions is assessed. Generally, any known technique may be employed to assess the correlation, such as, but not limited to, a goodness of fit (GOF) between the line's observed distribution and the reference distribution. A maximum likelihood estimation (MLE) of reference distribution parameters may also be generated from a line's observed line data distribution whereby the reference parameter values selected are those that produce a distribution that gives the observed data the greatest probability (i.e., parameters that maximize the likelihood function).

The method 201 completes at operation 270. Where a sufficient correlation is identified, acceptable model parameters found, etc., the disruptions or parameter values/events comprising the observed distribution are associated with a line activity or line condition (fault) characterized by the reference distribution or model. In one embodiment, a human-initiated disruptive activity is identified on a line where a distribution of disruptions (e.g., retrain events) is identified as correlating with a reference distribution (e.g., a Poisson distribution) characterizing human initiated line activity (e.g., power cycling of the modem, customer or neighborhood use of one or more appliances that causes excessive interference, or placing or receiving a phone call on a wired telephone with a missing or inoperative micro-filter that causes the DSL modem to lose synchronization and triggers a retrain). As such disruptions are effects that may also be caused by other sources, such as a random external interference impairing the channel through excessive noise (impulse or otherwise), the ability to identify a human-initiated disruption enables a DSL controller or DSL management system (DMS) to properly address the issue. For example, if retrain events are occurring due to impulse noise originating from external interference, then the DSL line profile may be changed to accommodate the extra noise, whereas such activity would be unnecessary and unfruitful if the retrains are due to human initiated activity, like modem power cycling or a phone call activity on a wired telephone with a missing or inoperative micro-filter, etc.).

In another embodiment, at operation 270, a line condition or fault is identified based on a distribution of disruptions. For example, retrain events may be identified as correlating with a reference distribution associated with use of a plain old telephone service (POTS) device. In one such embodiment, a missing or inoperative micro-filter is inferred where the disruptions follow an activity pattern that is either correlated with statistical distributions of human phone call activities, or follows a periodic behavior consistent with some machine activities, such as an answering machine, fax machine, satellite receiver, television set-top box, or alarm system that may be connected to a line jack without a micro-filter.

In another embodiment, at operation 270, a line condition or fault is localized based on a distribution of disruptions on the line. For example, where a detected disruption pattern correlates well with reference distribution characterizing times of day when the customer is expected to be inside the house (e.g., workday evening hours, and on weekends), the line fault is inferred to be on the CPE-side. As another example of localizing a line fault, noting a loose or faulty copper connection can sometimes be influenced by the weather such as rain and temperature, where a disruption pattern correlates well with reference distribution characterizing an external weather temperature cycle and/or rain cycle, the line fault is inferred to be on the CO-side of the network interface device (NID).

Figure 3A:
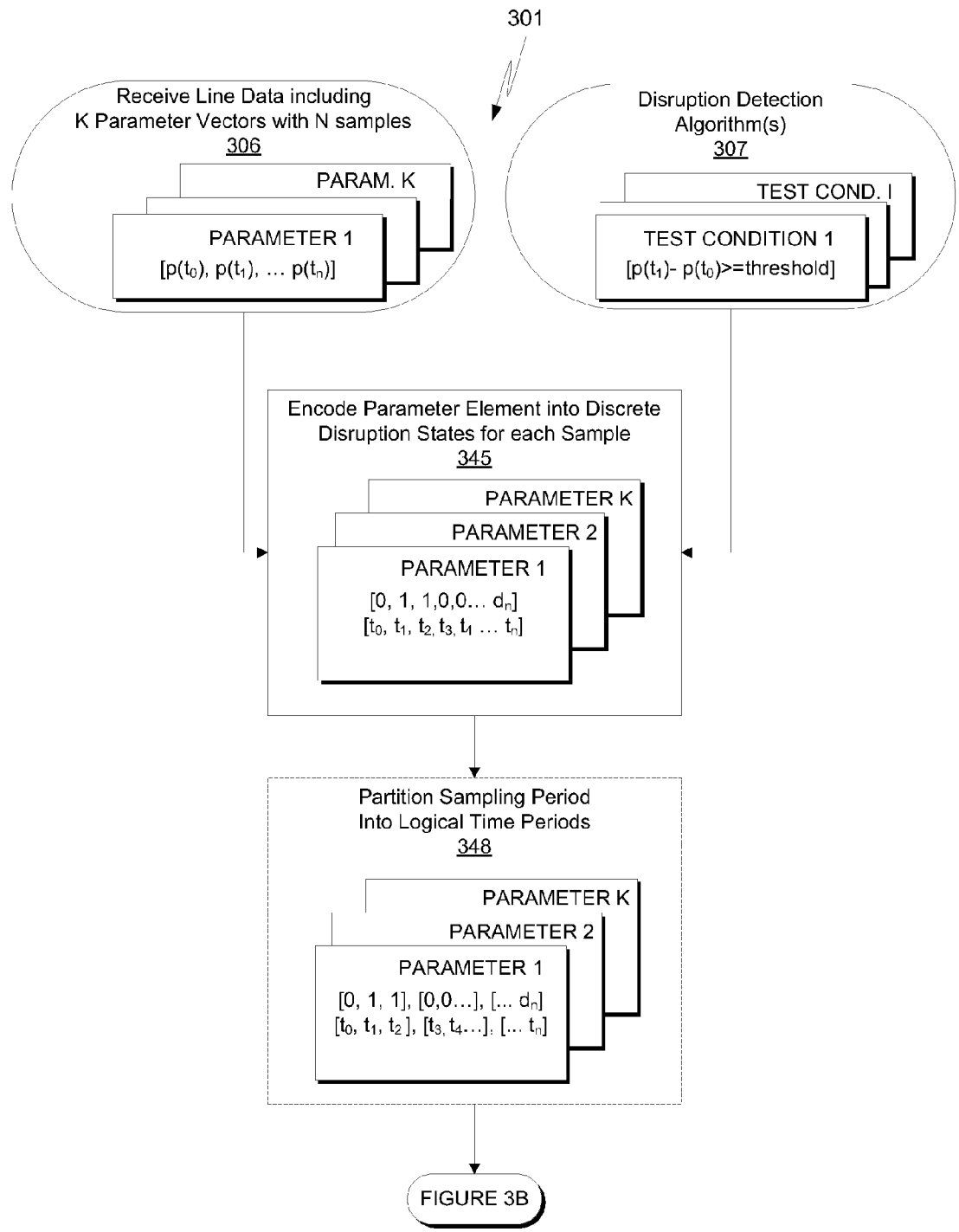
FIG. 3A is a flow diagram illustrating a method to encode line data parameters into discrete disruption states, in accordance with an embodiment.
Figure 3B:
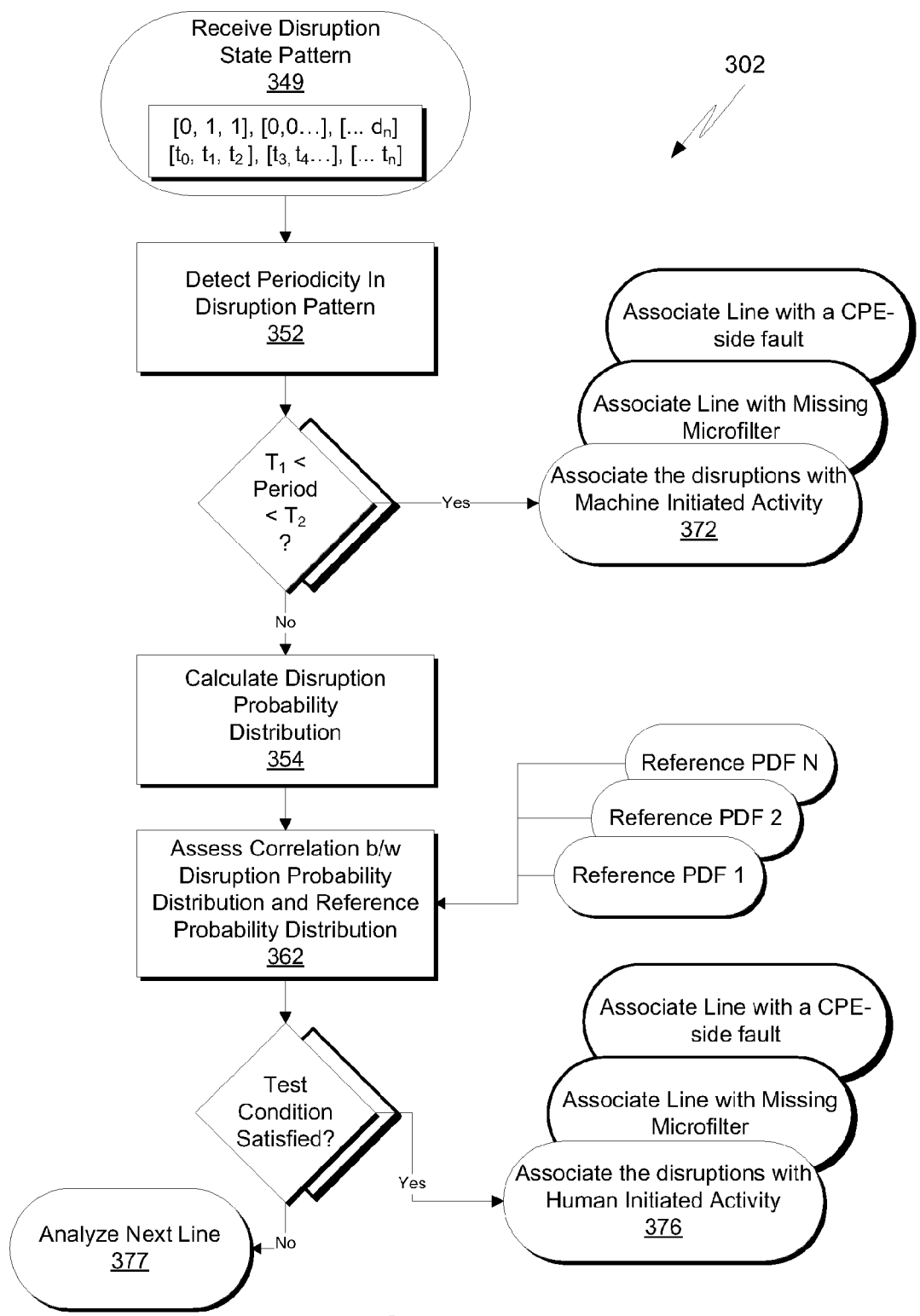
FIG. 3B is a flow diagram illustrating a method of associating a pattern of disruptions with a machine or human initiated activity affecting a line, in accordance with an embodiment.
Figure 3C:
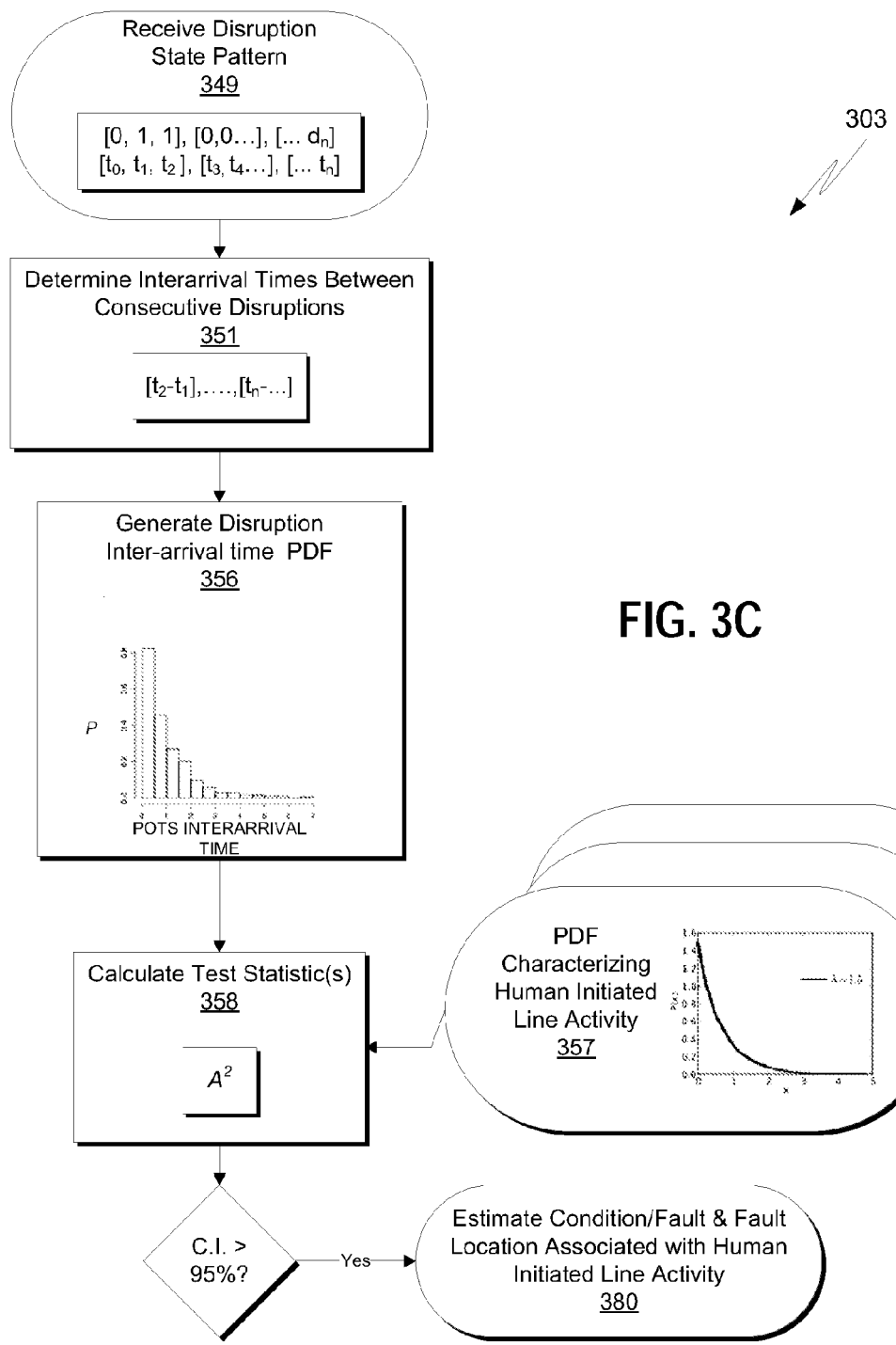
FIG. 3C is a flow diagram illustrating an exemplary method of assessing a correlation between a line data distribution and reference distribution characterizing a human-initiated activity to detect a fault in the line, in accordance with an embodiment.

FIGS. 3A-3C are flow diagrams further illustrating exemplary implementations of the method 201. FIG. 3A is a flow diagram illustrating a method 301 for time series analysis of collected line data. In the exemplary embodiment line data parameters are encoded into discrete disruption states. The method 301 begins with receiving line data at operation 306. The line data may be either performance or operational data, as described elsewhere herein in the context of FIG. 2. In the exemplary embodiment, the line data includes K parameter vectors with N samples for each parameter vector collected over a sampling period $t_n$. Each element in the parameter vector is associated with a reference time (e.g., $[p(t_0), p(t_1), \ldots p(t_n)]$), a univariate time series. With each sample associated with a sampling time t, the sample collection need not be strictly periodic.

One or more disruption detection algorithms are received at operation 307. Each disruption detection algorithm specifies a predetermined test condition. At operation 345 elements of the line data parameter vectors are encoded into discrete disruption states with disruption states assigned based on whether the test condition is satisfied, or not. In one embodiment, the discrete disruption states are binary with each element of a parameter vector (e.g., a time series) being encoded into 1's and 0's, (e.g., a 1 where the test condition is satisfied and a 0 where the test condition is not satisfied). In another embodiment, disruption detection may be based on valuations including more than two discrete states. For example, a disruption severity may be assessed based on a scaling, such as 0 to 10.

Generally, the test condition employed at operation 345 may be any known in the art to be useful for the purpose of detecting a DSL link disruption. In one embodiment a simple thresholding of a parameter value is applied to identify a disruption. Where the data parameter sample value satisfies the disruption detection threshold (i.e., $p(t_1)$>threshold), the test condition is satisfied and the detected disruption is associated with a reference time ($t_1$). In an alternative exemplary embodiment where a sudden change is to be detected, the test condition thresholds a difference between two values collected at consecutive sampling times for a given parameter (i.e., $p(t_1)-p(t_0)$) to determine an amount of change in at least one parameter collected at two consecutive sampling times. Where the difference between two consecutive data parameter samples satisfies the disruption detection threshold (i.e., $p(t_1)-p(t_0)$>threshold), the test condition is satisfied and the detected disruption is associated with a reference time included within the time interval $[t_1-t_0]$. In the exemplary embodiment, the disruption is more specifically associated with the time $t_1$, such that $t_0$ is assigned a 0 (no disruption), and so on through element n taken at same $t_n$. Of course, the disruption may otherwise be associated $t_0$, or any arbitrary time between $t_1$ and $t_0$, with more or less significance depending on the parameter sampling frequency.

In an embodiment, error detection algorithms are based on multiple $p(t_i)$ (i.e., not pairwise between two samples). Examples of such alternative test conditions include, but are not limited to, thresholding a series of averages between consecutive parameter value subsets (i.e., a moving or rolling average of 2, 3, or more consecutive parameter sample values), or thresholding a difference between value at time $t_n$ relative to a moving average. In further embodiments, as described elsewhere herein in the context of FIG. 4, the test conditions are made dependent on the quality of the line.

In an embodiment, the sampling period is partitioned into logical time periods at operation 348. Operation 348 is optional, but useful where patterns of line use are known to exist within the sampling period a priori. Without such partitioning of the sampling period, disruption distributions may be confounded. In embodiments, the logical time periods include, but are not limited to, day and night cycles, week day, week nights and weekend day, weekend nights cycles, and seasonal cycles (e.g., spanning months long raining seasons, etc.). In embodiments where a disruption pattern is partitioned into a plurality of disruption patterns spanning separate logical time periods within the sampling period, each disruption pattern for each parameter K is to be analyzed as a separate population. Additionally, the unified disruption pattern (prior to any partitioning) may be retained for analysis, which may be useful where periodicity is not known a priori and is instead to be detected. The method 301 then completes with outputting one or more disruption pattern for one or more line data (operational or performance) parameters for the line.

FIG. 3B is a flow diagram illustrating a method 302 for associating a pattern of disruptions, such as that generated by method 301, with a machine or human initiated activity affecting a line, in accordance with an embodiment. For instance, where customer or neighborhood use of one or more appliances causes excessive interference, home appliances would be used mostly on evening workdays and weekends, and the time span would be in the order of minutes to hours. Appliances at a place of business would be used mostly during weekday hours, and depending on the activity nature, can have a periodic pattern from week day to week day. Similarly, where an alarm system at a customer premises issues status updates to a control center over a line, such would likely occur in evening hours at a business during weekdays and throughout weekends. The method 302 begins with receiving at least one disruption pattern at operation 349. At operation 352, periodicity within the disruption pattern is detected. Generally, any known periodicity detection algorithm may be applied at operation 352 to detect a period known a priori or to detect an unknown period. In one exemplary embodiment, a periodicity of the disruptions is detected based on intervals of time between consecutive ones of the disruptions, referred to herein as adjacent disruption interarrival times. Thus, where a first disruption occurs at $t_0$ and the next disruption occurs at $t_1$, an adjacent interarrival time is calculated as $t_1-t_0$. For this embodiment, all adjacent interarrival times for a given disruption pattern are determined at operation 352, and may then be binned out across predetermined periods to arrive at counts having a specific period.

In an embodiment where periods are unknown and there is a potential for any period, performance data counters known to occur at given intervals over a day, a set of counters may be indexed consecutively (e.g., 0-95 for 96 counters) to span hours 0-24. A sum is then taken over the disruptions pattern spanning multiple days per counter index (e.g., 0-95). Counters with a disruption count above a certain threshold are identified as occurring at a daily periodic rate. Based on the inter-arrival time of the selected periodic counters, a smaller periodicity resolution, of for example 3 hours, can be identified. A similar action can be performed on counter data summed over different time periods (e.g., weekend days, etc.) In another embodiment where periods are unknown and there is a potential for any period, all interarrivals are tested. For example, where a first disruption occurs at $t_0$, the next disruption occurs at $t_1$, and another at $t_2$, interarrivals include $t_1-t_0$, $t_2-t_1$, and $t_2-t_0$, etc. As one example, an iterative application of all possible periods may be automatically performed by splitting the disruption pattern into segments at the given period and calculating a Hamming Distance between the segments. A period is detected where resulting segments have a sufficiently small Hamming Distance. Another technique relying on convolution to compare all possible periods concurrently is also known in the art and may be readily applied to the disruption pattern(s) determined for a line.

Where a period is detected in the disruption pattern, at operation 372 the DSL link disruptions are associated with either machine initiated activity, human activity, or seasonal effects, depending on the length of the period or phase. In one embodiment, for example where the detected period fall between a range of $T_1$ and $T_2$ that is one the order of hours, days or a few weeks, and there is dependence on logical time intervals, such as weekdays, weeknights, weekend days, etc., the disruptions are associated with activity initiated by a machine (which might be for example any of an answering machine, fax machine, satellite receiver, television set-top box, or alarm system connected to a line jack without a micro-filter). The line under test may further be associated with a missing/inoperative micro-filter because the disruption distribution matches a periodic CP phone state changes from off-hook or on-hook during machine initiated POTS activity (e.g., by an alarm system sending monitoring reports to a central security office), and it is known that line performance degradation attributable to an improper micro-filter state is dependent on the on-hook and off-hook status of a POTS device on the line.

In another embodiment, where the disruptions and/or parameter value(s) correlate with a time the customer is present at the customer premises, an inference is made that the line fault condition causing the disruption is more likely at the CPE than at the Central Office. In a further embodiment, where a missing micro-filter is estimated as a fault on the line, a line fault location is specified as being on the CPE-side of a NID on the line. Alternatively, where a sufficient number of events in the sample population have a period in the range of $T_3$ and $T_4$ that is on the order of months, the disruptions are associated with seasonal effects at operation 372. In further embodiments, where disruptions are associated with seasonal effects, a line fault location is specified as being on the CO-side of a NID on the line.

Where no periodicity is detected (or where no periodicity detection is performed at all), the method 302 proceeds to operation 354 with determination or calculation of a statistical probability distribution for the disruptions over at least a portion of the sampling period (i.e., including at least a subset of the sampling times). A correlation between the determined disruption's probability distribution function and one or more reference probability distribution functions (PDF) is then assessed at operation 362. The reference PDFs may be constructed based on observed statistics where such statistics for given line conditions are sufficiently unique so as to provide a basis for differentiation of a likely root cause. A reference PDF may come in the form of the Poisson distribution, as further described elsewhere herein, the disruption inter-arrival times can follow an Exponential distribution or a Gamma distribution having shape and scale parameters $(k, \theta)$, etc.

In embodiments, a reference PDF may be derived to describe one or more human initiated line activities. Human activities that can cause disruptions follow a certain statistical distribution, the most common being the Poisson distribution with the statistical parameter $\lambda$ varying for a given activity. For example, in one exemplary embodiment, disruptions (e.g., retrains) caused as a result of human intervention (such as using a wired telephone with a missing or inoperative micro-filter causing the DSL modem to retrain) may be detected at operation 362 based on a first reference PDF. Such disruptions have a different statistical signature than disruptions caused by other sources, such as excessive noise or impulse noise on a DSL line. A reference probability distribution for retrains caused by a missing or inoperative micro-filter may therefore be constructed based on observed statistics for human initiated POTS activity, such as placing and receiving a phone call over the line. Similarly, in further embodiments a corresponding reference probability distribution is constructed for retrains due to other causes, for example due to a specific type of impulse noise, or due to other noise sources.

For embodiments where a sampling period has been partitioned (e.g., at operation 348 of method 301), or where periodic retrains are observed at a specific time on the DSL lines at operation 352 (for example at late afternoon time), a statistical comparison or statistical fitting test is then performed at operation 362 between the reference distributions and the statistical distributions (e.g., of retrain counts) over the partitioned periods.

Where a sufficient correlation exists, the disruptions are associated with human initiated line activity at operation 376. The results of the comparison(s) may indicate whether the retrains during those specific periods is a result of human initiated POTS activity, modem power cycling, impulse noise, or other noise sources. Both human initiated POTS activity and modem power cycling may further be localized as arising from the CPE-side. If the correlation to the reference PDF(s) does not satisfy the test condition, the method 302 exits at operation 377 and may for example, trigger other line diagnostic algorithms, or return to method 301 for analysis of data from another line.

FIG. 3C is a diagram illustrating a method 303 for assessing a correlation between a disruption distribution on a line and a distribution characterizing a human-initiated activity to detect a fault in the line. This embodiment further illustrates that the present method may be applied beyond differentiating between disruptions caused human initiated activity on the line, but also may be applied to identify a specific fault in the line.

The method 303 begins with receiving the disruption pattern at operation 349. For the exemplary Poisson distribution, the inter-arrival time between the events occurrence (e.g., an inter-arrival time of consecutive phone telephone call) follows an Exponential distribution. Therefore, in the exemplary embodiment, the adjacent interarrival times are determined at operation 351 for each of the disruptions (i.e., interval of time between consecutive disruptions), as described elsewhere herein in the context of periodicity detection. At operation 356, a statistical probability distribution function (PDF) of inter-arrival time for the disruption occurrences over a certain period of time is generated.

At operation 358, the observed PDF is compared, fitted, or otherwise assessed against a reference distribution accessed at operation 357 (e.g., from a database comprising reference PDFs predetermined as probable for human phone call, and/or other line activities). In one such embodiment, a reference Exponential PDF predetermined on the basis of statistics collected on contemporary phone call usage in a given market can be used, where its parameter $\lambda$ is computed as the inverse of the sample mean of the samples used to construct the observed PDF. For example, where inter-arrival times is a set $\{x_i\}$, the histogram of $\{x_i\}$ gives the PDF, and the reference Exponential PDF's $\lambda$ is $$\frac{1}{\overline{\{x_i\}}}.$$

Where the statistics of call usage in a given market have an Exponential distribution, the $\lambda$ for that Exponential distribution is calculated from the data set. As another example, where the call usage in a given market is characterized by a Gamma distribution with shape k, based on the sample mean and k, a scale $\theta$ is determined to fully characterize the reference Gamma distribution.

Generally, the comparison or fitting operation 357 may entail calculation of any test condition known in the art for such a purpose, such as a goodness of fit (GOF) between the line PDF and reference distribution function. One exemplary technique is known in the art as the Anderson-Darling test where the test statistic or metric $A^2$ is calculated as a quantitative assessment of correlation between the observed sample distribution and the reference distribution. Where the test statistic passes a given test condition or criteria, such as $A^2$ corresponds to a threshold level of confidence (e.g., 95%) that the disruptions do arise from the reference distribution, the method 303 proceeds to operation 380 where the line fault, or fault location previously determined to be characterized by the reference distribution is ascribed to the line being analyzed. In further embodiments, a condition on the minimum number of events may be imposed to ensure a statistically significant result before a correlation is deemed sufficient. In one embodiment, where there is a sufficient correlation between the line PDF and a reference PDF describing human initiated call activity, the line under test is associated with a missing or inoperative micro-filter because the disruption distribution matches a probable distribution of CP phone state changes from off-hook or on-hook during POTS activity, and it is known that line performance degradation attributable to an improper micro-filter state is dependent on the on-hook and off-hook status of a POTS device on the line. In a further embodiment, where a missing micro-filter is estimated as a fault on the line, a line fault location is specified as being on the CPE-side of a NID on the line.

Figure 4:
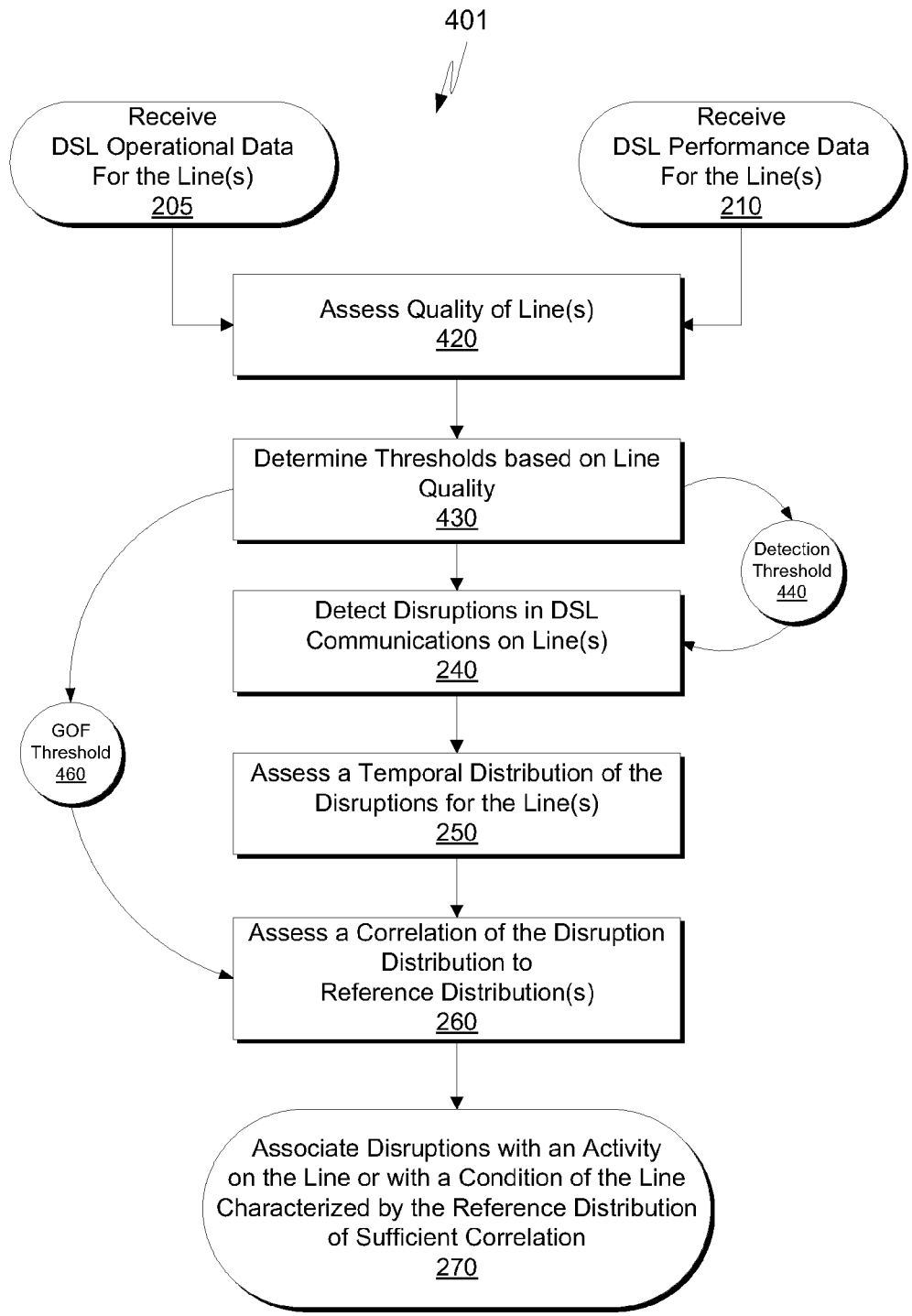
FIG. 4 is a flow diagram illustrating a line diagnostics method including a disruption detection and distribution analysis that is dependent on line quality, in accordance with an embodiment.

FIG. 4 is a flow diagram illustrating a line diagnostics method 401 including a line data distribution analysis that is dependent on line quality, in accordance with an embodiment. Generally, the line diagnostics method 401 includes all the attributes describe for method 201 (and thereby all the more specific features described in the context of FIGS. 3A-3C) and additionally includes the operations 420 and 430. At operation 420, the line quality is assessed based on operational or performance data collected from the line at operations 205 and 210. Many techniques are known for analyzing one or more of the data parameters described elsewhere herein to arrive at a line quality estimate and any such technique may be employed at operation 420. As one example, quality or stability of a line is deemed lower as function of channel and noise qualities based on any of CV counts, number of retrains, FEC violation, counts of errored seconds, or severe error seconds. A line quality or stability assessment may be generated at operation 420 as a discrete metric based on data parameter values exceeding a threshold (e.g., maximum counts) over a given period of time.

At operation 430, one or more data collection rates, collection periods, sample population size thresholds, tests, thresholds, etc. employed in the method 401 are made dependent on the line quality assessment from operation 420. In one embodiment, as further illustrated in FIG. 4, a disruption detection threshold 440 that is employed to classify a given line data parameter value or change in value as a disruption at operation 240 is varied based on the line quality assessment. For example, where line quality is poor, the disruption detection threshold may be made more conservative to reduce false positive errors. In another embodiment where line quality is poor, disruption detection may be premised on more than one data parameter satisfying a test condition concurrently. In another embodiment where line quality is poor, a longer sampling period or higher sampling frequency is employed than is for a higher quality line. In another embodiment, a threshold defining a minimum sufficiency for assessing the correlation between the disruption and the reference distribution is adjusted based on the assessed quality of the line. For the exemplary embodiment illustrated in FIG. 4, a GOF threshold 460 is made more stringent where line quality is poor. In further embodiments, for a poorer quality line, a higher number of disruption over a longer period of time are needed before a decision on the line is reached. For a better quality line, observation period can be smaller and the thresholds relatively relaxed.

Figure 5:
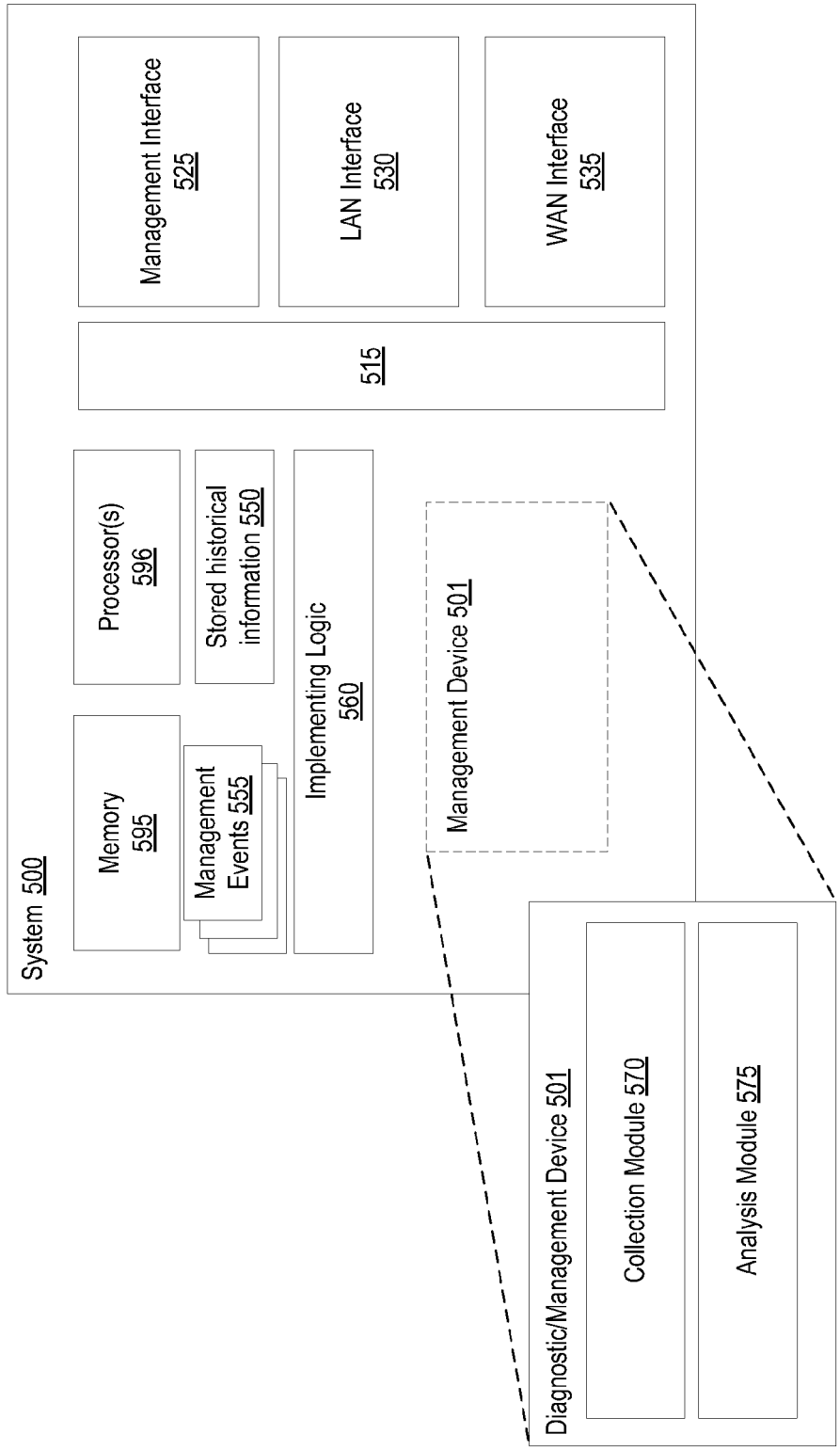
FIG. 5 is a functional block diagram illustrating a system configured to perform the line diagnostics method illustrated in FIG. 2, 3A-3C, or 4, in accordance with an embodiment.

FIG. 5 is a functional block diagram illustrating a system 500 configured to perform the line diagnostics method illustrated in FIG. 1, in accordance with an embodiment. Generally, the system 500 is to perform one or more of the methods 201, 301, 302, 303, or 401 as described elsewhere herein, in an automated fashion.

In the illustrated embodiment, system 500 includes a memory 595 and a processor or processors 596. For example, memory 595 may store instructions to be executed and processor(s) 596 may execute such instructions. Processor(s) 596 may also implement or execute implementing logic 560 to implement the diagnostic algorithms discussed herein. System 500 includes communication bus(es) 515 to transfer transactions, instructions, requests, and data within system 500 among a plurality of peripheral devices communicably interfaced with one or more communication buses 515 (e.g., as further illustrated in FIG. 7). System 500 further includes management interface 525, for example, to receive analysis requests, return diagnostic results, and otherwise interface with the network elements illustrated in FIG. 1.

In embodiments, management interface 525 communicates information via an out-of-band connection separate from DSL line based communications, where "in-band" communications are communications that traverse the same communication means as payload data (e.g., content) being exchanged between networked devices. System 500 further includes DSL line interface 530 to communicate information via a LAN based connection, to monitor connected lines (e.g., line 112 in FIG. 1). System 500 may further include multiple management events 555, any of which may be initiated responsive to analysis of the vectored and non-vectored lines. For example, additional diagnostics, line data collection, and the like may be specified and triggered as management events 555. Stored historical information 550 (e.g., performance and/or operational line data) and management events 555 may be stored upon a hard drive, a persistent data store, a database(s), or other memory/storage location within system 500.

Within system 500 is a line diagnostic and management device 501 which includes a data collection module 670 to collect performance and operational data for a line, and an analysis module 575. The line diagnostic and management device 501 may be installed and configured in a compatible system 500 as is depicted by FIG. 5, or provided separately so as to operate in conjunction with appropriate implementing logic or other software.

In accordance with one embodiment, collection module 570 collects line data and line transmission data from interfaced digital communication lines over the interface 530 or from other network elements via management interface 525 and stores the data to a memory. The analysis module 575 communicatively coupled to the collection module 570 analyzes the information retrieved via collection module 570. For example, in an embodiment the analysis module 575 is to determine a disruption distribution for the line under analysis. The diagnostics module 580 is further coupled to the analysis module 575, to receive a disruption distribution observed for a line and assess a correlation between the observed disruption distribution and one or more reference distributions.

In specific embodiments, the memory 595 to store values of at least one data parameter sampled from the line. The analysis module 575 is communicatively coupled to the memory 595 and is to identify a plurality of disruptions in DSL communications on the line through analysis of at least one data parameter sampled from the line; generate a temporal distribution of the disruptions over a least a portion of the sampling period; assess a correlation between the disruption distribution and a reference distribution; and associate the disruptions with an activity on the line or with a condition of the line characterized by the reference distribution in response to determining the assessed correlation satisfies a test condition.

In further embodiments of the system 500, the analysis module 575 is to assess the disruption distribution by determining a statistical probability distribution for the disruptions over at least a portion of the sampling period based on a sampling time associated with each of the disruptions; determine a statistical probability distribution by determining an observed probability distribution function (PDF) of intervals of time between consecutive ones of the disruptions; and associate the disruptions with the human initiated activity in response to determining a sufficient correlation between the observed PDF and a reference distribution function characterizing a probability distribution of the human initiated activity on the line.

In further embodiments, the analysis module is 575 to assess a correlation between the disruption distribution and the reference distribution by calculating a goodness of fit (GOF) between the PDF and a reference distribution function and determining if the GOF satisfies a minimum threshold. In certain such embodiments, the analysis module 575 is to evaluate the quality of the line by at least one of: assessing a stability of the line based on statistics derived from operational data collected over time\from at least one of the DSL transceivers; or assessing a stability of the line based on at least one of code violation (CV) count, number of retrains, forward error correction (FEC) violations, errored seconds counts, or severe error seconds (SES).

In further embodiments, the analysis module is to assess a quality of the line based on operational or performance data collected from the line; and adjust, based on the assessed quality of the line, at least one of: the disruption detection threshold or a bound on the number of disruptions permitted during portions of the sample period; or a threshold defining a minimum sufficiency for assessing the correlation between the disruption distribution and the reference distribution.

Figure 6:
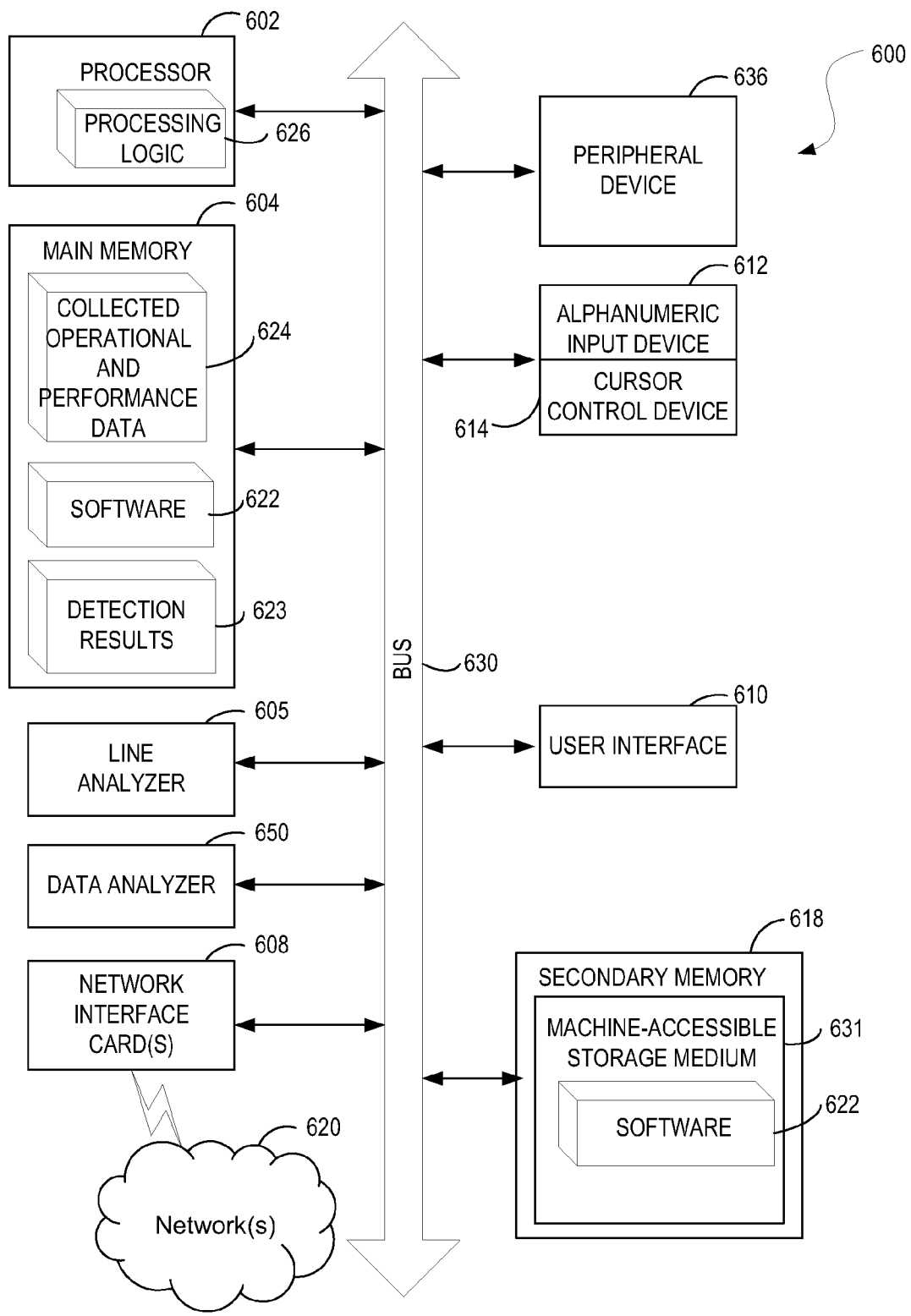
FIG. 6 is a diagrammatic representation of a machine in the exemplary form of a computer system that is configured to automatically perform at least one, and preferably all, of the functional blocks illustrated FIG. 5, in accordance with embodiments of the present invention.

While generally any machine means known in the art may be utilized to implement the various functional modules described in the context of system 500, FIG. 6 illustrates a diagrammatic representation of a computer system 600, in accordance with one embodiment, within which a set of instructions, for causing the computer system 600 to perform any one or more of the methodologies discussed herein, may be executed to implement the system 500. In alternative embodiments, the machine may be connected, networked, interfaced, etc., with other machines in a Local Area Network (LAN), a Wide Area Network, an intranet, an extranet, or the Internet. The computer system 600 may operate in the capacity of a server or a client machine in a client-server network environment, or as a peer machine in a peer-to-peer (or distributed) network environment. Certain embodiments of the machine may be in the form of a personal computer (PC), a set top box (STB), a web appliance, a server, or any machine known in the art capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and persistent data base implementations), which communicate with each other via a bus 630. Main memory 604 includes information and instructions and software program components necessary for performing and executing the functions with respect to the various embodiments of the systems and methods described herein. Optimization instructions 623 may be triggered based on, for example, analysis of neighborhood information, SNR data, PSD data, noise levels with mitigation active and noise levels with mitigation inactive, and so forth. Collected SELT/DELT, and line transmission data and calculations 624 are stored within main memory 604. Line configuration results as well as optimization instructions 623 may be stored within main memory 604. Main memory 604 and its sub-elements (e.g. 623 and 624) are operable in conjunction with processing logic 626 and/or software 622 and processor 602 to perform the methodologies discussed herein.

Processor 602 represents one or more general-purpose processing devices such as a microprocessor, central processing unit, or the like. Processor 602 may also be one or more special-purpose processing devices such as an application specific integrated circuit (ASIC), a field programmable gate array (FPGA), a digital signal processor (DSP), or the like. Processor 602 is configured to execute the processing logic 626 for automatically performing the operations and functionality which is discussed elsewhere herein (e.g., as methods 201, 202, 401, 402, 403, 404, etc.).

The computer system 600 may further include one or more network interface cards 608 to communicatively interface the computer system 600 with one or more networks 620 from which information may be collected for analysis. The computer system 600 also may include a user interface 610 (such as a video display unit, a liquid crystal display (LCD)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The computer system 600 may perform the functions of a line analyzer 605 capable interfacing with digital communication lines in vectored and non-vectored groups, monitoring, collecting operational and performance data, data 624, analyzing, and reporting detection results 623, and initiating, triggering, and executing various instructions including the execution of commands and instructions to diagnose a line based on collected operational and performance data 624 and operational and performance data.

The secondary memory 618 may include at least one non-transitory machine-readable storage medium (or more specifically a non-transitory machine-accessible storage medium) 631 on which is stored one or more sets of instructions (e.g., software 622) embodying any one or more of the methodologies or functions described herein. Software 622 may also reside, or alternatively reside within main memory 604, and may further reside completely or at least partially within the processor 602 during execution thereof by the computer system 600, the main memory 604 and the processor 602 also constituting machine-readable storage media. The software 622 may further be transmitted or received over a network 620 via the network interface card 608.

The above description is illustrative, and not restrictive. For example, while flow diagrams in the figures show a particular order of operations performed by certain embodiments of the invention, it should be understood that such order may not be required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A method of diagnosing a twisted pair telephone line having a DSL transceiver at opposite ends of the line, the method comprising:
   identifying a plurality of disruptions in DSL communications on the line through analysis of at least one data parameter sampled over a time period from the line;
   generating a temporal distribution of the disruptions over a least a portion of the sampling period;
   assessing a correlation between the temporal distribution of the disruptions and one or more reference distributions; and
   associating the disruptions with an activity on the line or with a condition of the line corresponding to the one or more reference distributions in response to assessing the correlation.

2. The method of claim 1, wherein identifying at least one of the disruptions further comprises:
   determining an amount of change in at least one parameter collected at two or more consecutive sampling times; and
   identifying a disruption in response to the amount of change satisfying a disruption detection threshold.

3. The method of claim 1, wherein assessing the correlation between the temporal distribution of the disruptions and the one or more reference distributions further comprises determining an observed statistical probability distribution for the disruptions over at least a portion of the sampling time period based on sampling times associated with each disruption.

4. The method of claim 3, wherein determining the observed statistical probability distribution further comprises determining a probability distribution function (PDF) of intervals of time between consecutive disruptions;
   wherein the one or more reference distributions characterize a probability distribution of a human initiated activity on the line; and
   wherein associating the disruptions with an activity on the line or with a condition of the line further comprises associating the line disruptions with the human initiated activity.

5. The method of claim 4, wherein the disruptions comprise retrain events on the line.

6. The method of claim 1, wherein assessing the correlation between the disruptions distribution and one or more reference distributions further comprises determining a periodicity of the disruptions based on intervals of time between consecutive disruptions;
   wherein the one or more reference distributions characterize a periodicity of a machine initiated activity on the line; and
   wherein associating the disruptions with an activity on the line or with a condition of the line further comprises associating the disruptions with the machine initiated activity.

7. The method of claim 4, wherein the initiated line activity is a use of plain old telephone service (POTS) on the line, and wherein associating the disruptions with an activity on the line or with a condition of the line further comprises associating the disruptions with a missing or defective micro-filter on the line.

8. The method of claim 3, wherein assessing a correlation between the temporal distribution of the disruptions and the one or more reference distributions further comprises:
   calculating a goodness of fit (GOF) between a probability distribution function (PDF) and a reference distribution function; and
   determining if the GOF satisfies a minimum threshold.

9. The method of claim 8, wherein calculating the GOF comprises determining an $A^2$ metric of the Anderson-Darling test, and wherein determining if the GOF satisfies a minimum threshold comprises determining if the $A^2$ metric corresponds to a threshold level of confidence.

10. The method of claim 1, further comprising partitioning the sampling period into a plurality of logical time periods including at least one of: a week day, a week night, a weekend day or a weekend night, wherein assessing the correlation between the temporal distribution of the disruptions and one or more reference distributions further comprises determining a separate statistical probability distribution functions (PDF) for the disruptions within each of the logical time periods, and wherein a correlation between the temporal distribution of the disruptions and the one or more reference distributions is assessed separately for each of the logical time periods based on the PDF associated with each logical time period.

11. The method of claim 1, further comprising:
   assessing a quality of the line based on operational or performance data collected from the line; and
   adjusting, based on the assessed quality of the line, at least one of:
      a disruption detection threshold or a bound on the number of disruptions permitted during portions of the sample time period;

a threshold defining a minimum sufficiency for assessing the correlation between the disruption distribution and the one or more reference distributions; or a threshold defining a minimum number of observed disruptions.

12. The method of claim 11, wherein the disruption detection threshold is adjusted to decrease detection sensitivity for a lower quality line or increase detection sensitivity for a higher quality line, and wherein assessing the quality of the line further comprises at least one of:

assessing channel and noise qualities of the line based on statistics derived from operational data collected over time from at least one of DSL transceivers; or assessing a stability of the line based on at least one of:
code violation (CV) count,
number of retrains,
forward error correction (FEC) violations,
errored seconds counts, or
severe error seconds (SES).

13. The method of claim 1, comprises collecting data which includes operational or performance data collected from at least one of DSL transceivers.

14. The method of claim 1, further comprising:

collecting operational data by polling at least one of DSL transceivers for the value of at least one parameter at known sampling times over the sampling time period, or collecting performance data by recording a level of counts for at least one parameter at a predetermined sampling frequency over the sampling time period.

15. A system for diagnosing a twisted pair telephone line, the system comprising:

a memory to store values of at least one data parameter sampled from the line;

an analysis module communicatively coupled to the memory to:

identify a plurality of disruptions in DSL communications on the line through analysis of at least one data parameter sampled over a time period from the line;

generate a temporal distribution of the disruptions over a least a portion of the sampling time period;

assess a correlation between the temporal distribution of the disruptions and a reference distribution; and associate the disruptions with an activity on the line or with a condition of the line corresponding to the reference distribution in response to assessing the correlation.

16. The system of claim 15, wherein the analysis module is to:

assess the temporal distribution of the disruptions by determining a statistical probability distribution for the disruptions over at least a portion of the sampling time period based on a sampling time associated with each of the disruptions;

determine a statistical probability distribution by determining an observed probability distribution function (PDF) of intervals of time between consecutive ones of the disruptions; and associate the disruptions with the human initiated activity in response to determining a sufficient correlation between the observed PDF and a reference distribution function characterizing a probability distribution of the human initiated activity on the line.

17. The system of claim 16, wherein the analysis module is to assess a correlation between the temporal distribution of the disruptions and the reference distribution by calculating a goodness of fit (GOF) between the PDF and a reference distribution function and determining if the GOF satisfies a minimum threshold.

18. The system of claim 17, wherein the analysis module is to evaluate the quality of the line by at least one of:

assessing channel and noise qualities of the line based on statistics derived from operational data collected over time from at least one of DSL transceivers; or assessing a stability of the line based on at least one of:
code violation (CV) count,
number of retrains,
forward error correction (FEC) violations,
errored seconds counts, or
severe error seconds (SES).

19. The system of claim 15, wherein the analysis module is to:

assess a quality of the line based on operational or performance data collected from the line; and adjust, based on the assessed quality of the line, at least one of:

a disruption detection threshold or a bound on the number of disruptions permitted during portions of the sample period;

a threshold defining a minimum sufficiency for assessing the correlation between the disruption distribution and the reference distribution; or a threshold defining a minimum number of observed disruptions.

20. At least one computer readable storage medium comprising instructions thereon, that when executed by a processor cause a computer to perform the method of claim 1.

21. A system for characterizing a physical configuration of a twisted pair telephone line, the system comprising:

a means to store to values of at least one data parameter sampled from the line;

a means to identify a plurality of disruptions in DSL communications on the line through analysis of at least one data parameter sampled over a time period from the line;

a means to generate a temporal distribution of the disruptions over a least a portion of the sampling period;

a means to assess a correlation between the temporal distribution of the disruptions and a reference distribution; and a means to associate the disruptions with an activity on the line or with a condition of the line corresponding to the reference distribution in response to assessing the correlation.

* * * * *